US011360868B2

United States Patent
Pio (10) Patent No.: US 11,360,868 B2
(45) Date of Patent: Jun. 14, 2022

(54) REDUNDANT CLOUD MEMORY STORAGE FOR A MEMORY SUBSYSTEM

(71) Applicant: Micron Technology, Inc., Boise, ID (US)

(72) Inventor: Federico Pio, Brugherio (IT)

(73) Assignee: MICRON TECHNOLOGY, INC., Boise, ID (US)

( * ) Notice: Subject to any disclaimer, the term of this patent is extended or adjusted under 35 U.S.C. 154(b) by 444 days.

(21) Appl. No.: 16/434,602

(22) Filed: Jun. 7, 2019

(65) Prior Publication Data
US 2020/0387434 A1 Dec. 10, 2020

(51) Int. Cl.
G06F 11/00 (2006.01)
G06F 11/20 (2006.01)
G06F 11/07 (2006.01)
G06F 3/06 (2006.01)

(52) U.S. Cl.
CPC .......... *G06F 11/2094* (2013.01); *G06F 3/067* (2013.01); *G06F 3/0617* (2013.01); *G06F 3/0644* (2013.01); *G06F 11/073* (2013.01)

(58) Field of Classification Search
CPC ... G06F 11/2094; G06F 11/073; G06F 3/0619
See application file for complete search history.

(56) References Cited

U.S. PATENT DOCUMENTS

2019/0087290 A1\* 3/2019 Rutman ............. G06F 11/1092

\* cited by examiner

*Primary Examiner* — Philip Guyton
(74) *Attorney, Agent, or Firm* — Nicholson De Vos Webster & Elliott LLP (57) ABSTRACT

A method for managing memory element failures in a memory subsystem is described. The method includes detecting, by the memory subsystem, a failed memory element in the memory subsystem and transmitting a redundant memory request based on detection of the failed memory element. The redundant memory request seeks to utilize memory storage in an external storage system in place of the failed memory element in the memory subsystem. Thereafter, the memory subsystem receives, from the external storage system, a redundant memory request confirmation, which indicates that the redundant memory request has been fulfilled and includes an address of a location in the external storage system. In response to receipt of the redundant memory request confirmation, the memory subsystem updates memory management information to map a logical address, which was previously mapped to the failed memory element, to the location in the external storage system.

18 Claims, 7 Drawing Sheets

REDUNDANT CLOUD MEMORY STORAGE FOR A MEMORY SUBSYSTEM

TECHNICAL FIELD

The present disclosure generally relates to cloud memory components, and more specifically, relates to redundant cloud memory storage for a memory subsystem.

BACKGROUND ART

A memory subsystem can be a storage system, such as a solid-state drive (SSD), or a hard disk drive (HDD). A memory subsystem can be a memory module, such as a dual in-line memory module (DIMM), a small outline DIMM (SO-DIMM), or a non-volatile dual in-line memory module (NVDIMM). A memory subsystem can include one or more memory components that store data. The memory components can be, for example, non-volatile memory components and volatile memory components. In general, a host system can utilize a memory subsystem to store data at the memory components and to retrieve data from the memory components.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Aspects of the present disclosure are directed to redundant cloud memory storage for a memory subsystem. A memory subsystem is also hereinafter referred to as a "memory device." An example of a memory subsystem is a memory module that is connected to a central processing unit (CPU) via a memory bus. Examples of memory modules include a dual in-line memory module (DIMM), a small outline DIMM (SO-DIMM), a non-volatile dual in-line memory module (NVDIMM), etc. Another example of a memory subsystem is a storage device that is connected to the central processing unit (CPU) via a peripheral interconnect (e.g., an input/output bus, a storage area network, etc.). Examples of storage devices include a solid-state drive (SSD), a flash drive, a universal serial bus (USB) flash drive, and a hard disk drive (HDD). In some embodiments, the memory subsystem is a hybrid memory/storage subsystem. In general, a host system can utilize a memory subsystem that includes one or more memory components. The host system can provide data to be stored at the memory subsystem and can request data to be retrieved from the memory subsystem.

Memory subsystems can include inactive memory elements (sometimes referred to as spare memory elements) that are initially unused but are activated in response to a failure of active memory elements. For example, the memory subsystem can include a set of active memory elements and a set of inactive memory elements that reside in the same physical structure (e.g., the set of active memory elements and the set of inactive memory elements reside on the same die). The set of active memory elements are active/operational such that a memory controller of the memory subsystem can utilize these active memory elements to perform memory access operations (e.g., writes/erase operations and read operations) triggered by a host system or otherwise triggered in the memory subsystem (e.g., performed for wear leveling procedures in the memory subsystem). In this memory subsystem, the memory controller can monitor the set of active memory elements to determine a memory element failure. For example, the memory controller can determine a failure of a write or read operation while using an active memory element (e.g., the memory controller cannot write data to this active memory element and/or cannot read data from this active memory element) and consequently determine that the active memory element has failed. A memory element failure can be the result of a structural issue with the memory element based on (1) a manufacturing defect, (2) a design defect, and/or (3) wear. In response to detection of a failure to one or more memory elements from the set of active memory elements, the memory controller can activate a corresponding number of memory elements from the set of inactive memory elements. Thus, these previously inactive memory elements are now active memory elements that can be used for performing memory operations. By activating inactive memory elements, the memory subsystem ensures that the memory subsystem maintains a consistent memory capacity available to a host system.

Although inactive memory elements can be used as replacements for failed active memory elements, the memory subsystem has a limited amount of physical space and consequently only a limited number of inactive memory elements can be included in the memory subsystem at the time of manufacture without significantly impacting the overall active/available capacity of the memory subsystem. In particular, while the number of inactive memory elements can be configured to be large, this takes away from the active memory elements of the memory subsystem as physical space is devoted to inactive memory elements that only become active when active memory elements fail. Accordingly, a limited number of inactive memory elements are provided in the memory subsystem to address memory element failures while not significantly affecting active capacity of the memory subsystem. After the number of failed active memory elements has surpassed the number of originally available inactive memory elements, the active capacity of the memory subsystem will be less than the original active capacity. Thus, providing inactive memory elements in the memory subsystem can offer mixed results in that (1) providing a large number of inactive memory elements will address a similarly large number of failed active memory elements but will negatively impact the available/active memory capacity of the memory subsystem as the large number of inactive memory elements take the place of active memory elements in the memory subsystem and (2) providing a small number of inactive memory elements will not severely impact the available active memory capacity of the memory subsystem but will provide limited support for addressing failed active memory elements as the number of failed active memory elements could extend past the small number of inactive memory elements.

Aspects of the present disclosure address the above and other deficiencies by configuring a cloud-based external storage system for use by the memory subsystem when memory element failures exceed onboard memory element redundancy. In particular, in response to detection of a failure of an active memory element, the memory subsystem attempts to locate and activate a local inactive memory element (i.e., an inactive memory element that is within the memory subsystem). In response to failing to detect an available local inactive memory element, the memory subsystem transmits a redundant memory request to a cloud-based external storage system for utilizing external storage provided by the cloud-based external storage system in place of the failed memory element. In particular, the memory subsystem can transmit a redundant memory request to an associated host system, which includes a network interface for accessing the cloud-based external storage system. The host system assists the memory subsystem register an account with the cloud-based external storage system and reserve segments of external storage provided by the cloud-based external storage system. The memory subsystem records the use of the cloud-based external storage system in relation to particular logical addresses originally mapped to the failed memory elements (sometimes referred to a virtual addresses or host addresses). For example, the memory subsystem can maintain a logical-to-physical table, which records mappings between logical addresses used by host systems and physical addresses of memory elements. When the memory subsystem receives a memory request from a host system, the memory request includes a logical address. The memory subsystem indexes into the logical-to-physical table to determine an entry corresponding to the received logical address. When the logical address corresponds to a memory element located in the memory components of the memory subsystem (i.e., a local memory element), a corresponding entry of the logical address in the logical-to-physical table includes the physical address for this memory element. However, when the logical address corresponds to a segment of the cloud-based external storage system, a corresponding entry of the logical address in the logical-to-physical table includes a reference to the cloud-based external storage system such that the memory subsystem can be triggered to send a redundant memory request to the cloud-based storage system for fulfilling the memory request. Accordingly, as will be described in additional detail herein, the memory subsystem can utilize the cloud-based external storage system to account for memory element failures that exceed internal redundancy of the memory subsystem. By utilizing both local inactive memory elements and external memory storage (sometimes referred to a remote memory storage), the memory subsystem described herein allows for (1) use of a limited supply of lower latency, local memory elements to address memory element failures and (2) use of a nearly limitless supply of higher latency, external storage to address memory element failures when lower latency, local memory elements are unavailable. Thus, the memory subsystem will maintain high performance standards while ensuring a consistent amount of available memory capacity throughout the lifetime of the memory subsystem and irrespective of the number of memory element failures.

Figure 1:
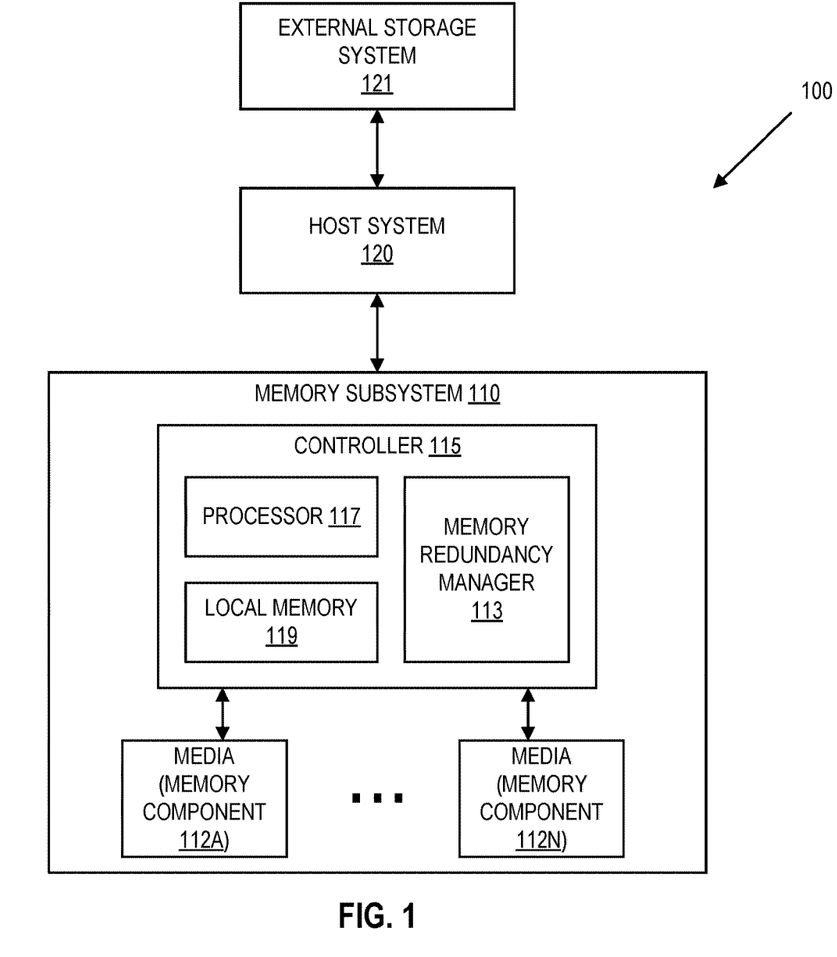
FIG. 1 illustrates an example computing environment that includes a memory subsystem, in accordance with some embodiments of the present disclosure.

FIG. 1 illustrates an example computing environment 100 that includes a memory subsystem 110 in accordance with some embodiments of the present disclosure. The memory subsystem 110 can include media, such as memory components 112A to 112N. The memory components 112A to 112N can be volatile memory components, non-volatile memory components, or a combination of such. In some embodiments, the memory subsystem is a storage system. An example of a storage system is an SSD. In some embodiments, the memory subsystem 110 is a hybrid memory/storage subsystem. In general, the computing environment 100 can include a host system 120 that uses the memory subsystem 110. For example, the host system 120 can write data to the memory subsystem 110 and read data from the memory subsystem 110.

The host system 120 can be a computing device such as a desktop computer, laptop computer, network server, mobile device, or such computing device that includes a memory and a processing device. The host system 120 can include or be coupled to the memory subsystem 110 so that the host system 120 can read data from or write data to the memory subsystem 110. The host system 120 can be coupled to the memory subsystem 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory subsystem 110. The host system 120 can further utilize an NVM Express (NVMe) interface to access the memory components 112A to 112N when the memory subsystem 110 is coupled with the host system 120 by the PCIe interface. The physical host interface can provide an interface for passing control, address, data, and other signals between the memory subsystem 110 and the host system 120.

The memory components 112A to 112N can include any combination of the different types of non-volatile memory components and/or volatile memory components. An example of non-volatile memory components includes a negative-and (NAND) type flash memory. Each of the memory components 112A to 112N can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and an MLC portion of memory cells. Each of the memory cells can store one or more bits of data (e.g., data blocks) used by the host system 120. Although non-volatile memory components such as NAND type flash memory are described, the memory components 112A to 112N can be based on any other type of memory such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 112A to 112N can be grouped as memory pages or data blocks that can refer to a unit of the memory component used to store data.

The memory system controller 115 (hereinafter referred to as "controller") can communicate with the memory components 112A to 112N to perform operations such as reading data, writing data, or erasing data at the memory components 112A to 112N and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or another suitable processor. The controller 115 can include a processor (processing device) 117 configured to execute instructions stored in local memory 119. In the illustrated example, the local memory 119 of the controller 115 includes an embedded memory configured to store instructions for performing various processes, operations, logic flows, and routines that control operation of the memory subsystem 110, including handling communications between the memory subsystem 110 and the host system 120. In some embodiments, the local memory 119 can include memory registers storing memory pointers, fetched data, etc. The local memory 119 can also include read-only memory (ROM) for storing micro-code. While the example memory subsystem 110 in FIG. 1 has been illustrated as including the controller 115, in another embodiment of the present disclosure, a memory subsystem 110 may not include a controller 115, and may instead rely upon external control (e.g., provided by an external host, or by a processor or controller separate from the memory subsystem).

In general, the controller 115 can receive commands or operations from the host system 120 and can convert the commands or operations into instructions or appropriate commands to achieve the desired access to the memory components 112A to 112N. The controller 115 can be responsible for other operations such as wear leveling operations, garbage collection operations, error detection and error-correcting code (ECC) operations, encryption operations, caching operations, and address translations between a logical block address and a physical block address that are associated with the memory components 112A to 112N. The controller 115 can further include host interface circuitry to communicate with the host system 120 via the physical host interface. The host interface circuitry can convert the commands received from the host system into command instructions to access the memory components 112A to 112N as well as convert responses associated with the memory components 112A to 112N into information for the host system 120.

The memory subsystem 110 can also include additional circuitry or components that are not illustrated. In some embodiments, the memory subsystem 110 can include a cache or buffer (e.g., DRAM) and address circuitry (e.g., a row decoder and a column decoder) that can receive an address from the controller 115 and decode the address to access the memory components 112A to 112N.

The memory subsystem 110 includes a memory redundancy manager 113 that can utilize memory resources in the external storage system 121 (sometimes referred to as the cloud-based storage system 121 or the cloud-based external storage system 121) to account for limited internal memory element redundancy. In some embodiments, the controller 115 includes at least a portion of the memory redundancy manager 113. For example, the controller 115 can include a processor 117 (processing device) configured to execute instructions stored in local memory 119 for performing the operations described herein. In some embodiments, the memory redundancy manager 113 is part of the host system 110, an application, or an operating system.

The memory redundancy manager 113 can manage the use of redundant memory resources in the computing environment 100, including redundant memory resources in the memory subsystem 110 (i.e., local memory resources) and redundant memory resources in the external storage system 121 (i.e., remote or external memory resources). Further details with regards to the operations of the memory redundancy manager 113 are described below.

Figure 2:
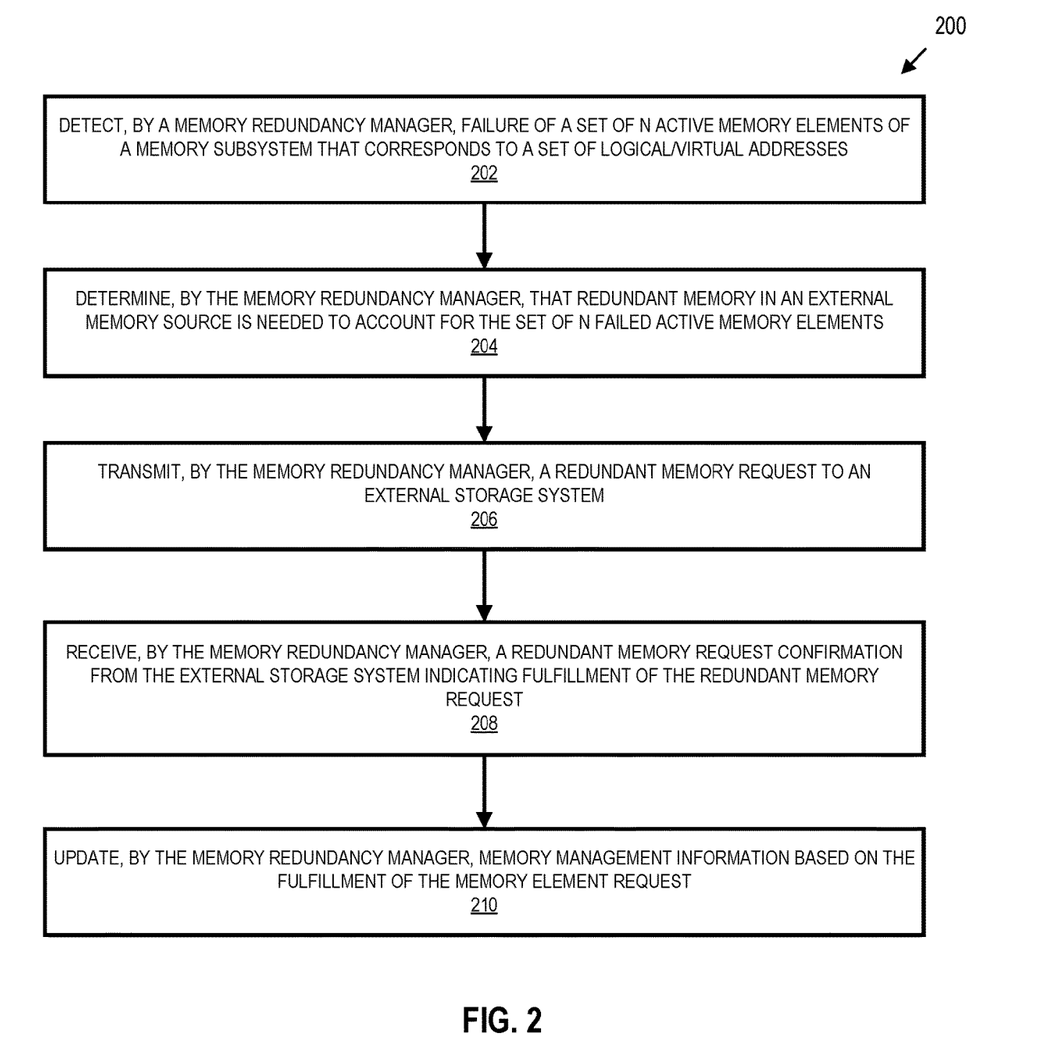
FIG. 2 is a flow diagram of an example method to manage memory element failures in accordance with some embodiments of the present disclosure.

FIG. 2 is a flow diagram of an example method 200 to manage memory element 302 failures, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the memory redundancy manager 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Figure 3:
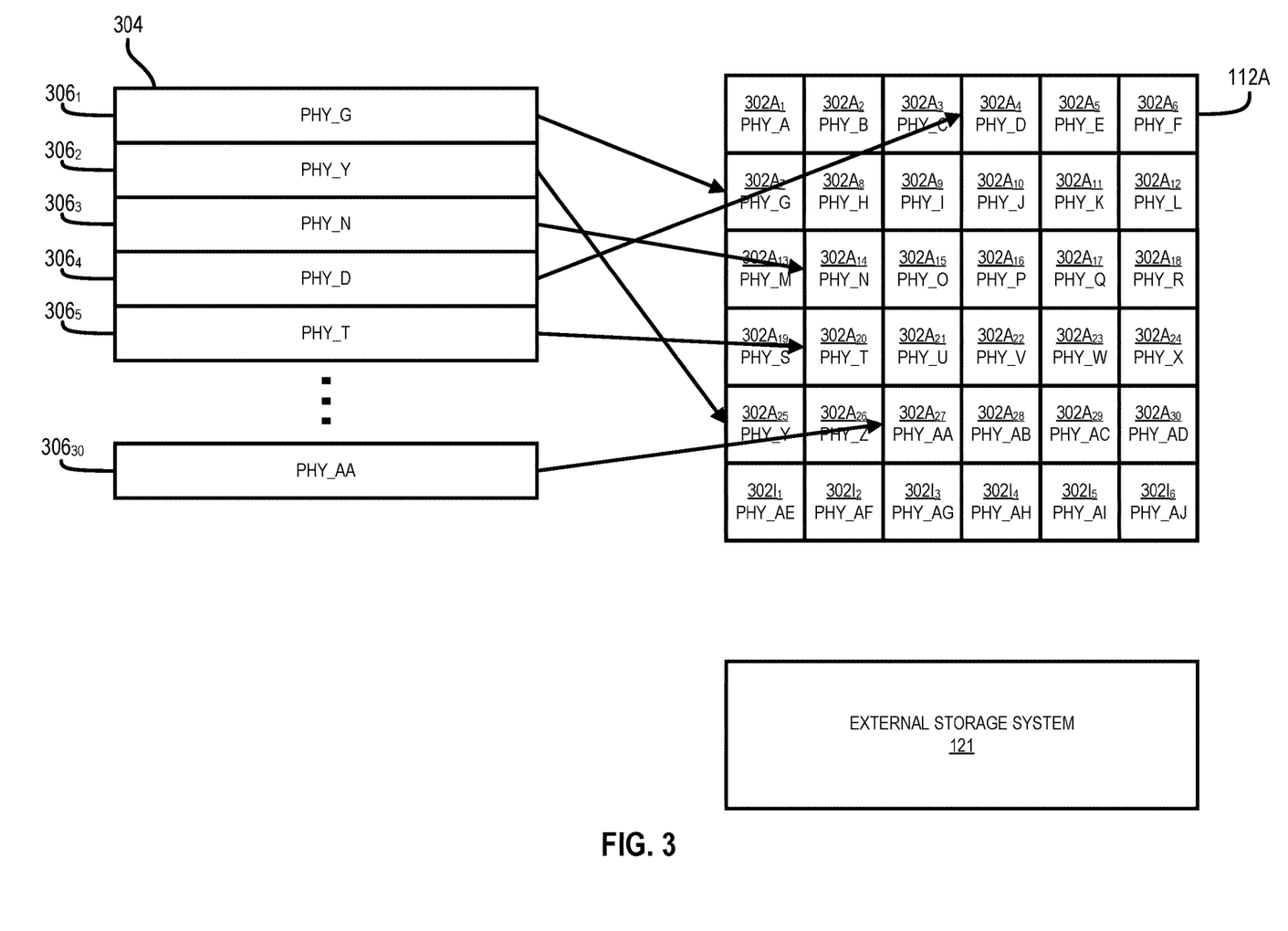
FIG. 3 shows a logical-to-physical table, memory elements in a memory component, and an external storage system, in accordance with some embodiments of the present disclosure.

At operation 202, the processing device detects a failure of a set of N active memory elements (where N is greater than or equal to one) that are associated with a set of logical addresses used by the host system 120. As described herein, the processing device (e.g., the memory subsystem 110) includes a number of memory elements. Memory elements can be any size or portion of the memory components 112A to 112N. For example, a memory element can be one or more memory cells, a managed unit, a logical block, a memory die, etc. Each of the memory components 112A to 112N can include a set of active memory elements and a set of inactive memory elements. For instance, FIG. 3 shows the memory component 112A with a set of active memory elements $302A_1$-$302A_{30}$ and a set of inactive memory elements $302I_1$-$302I_6$ (sometimes referred to as the spare memory elements $302I_1$-$302I_6$). Each of the memory elements $302A_1$-$302A_{30}$ and $302I_1$-$302I_6$ corresponds to respective internal physical addresses PHY_A-PHY_AJ, respectively. The ratio of active memory elements 302A to inactive memory elements 302I shown in FIG. 3 is for purposes of illustration and, in other embodiments, the ratio of active memory elements 302A to inactive memory elements 302I may be greater or smaller. As used herein, active memory elements 302A are memory elements 302 that are currently available to fulfill memory access operations/requests (e.g., a read operation or a write/erase request of a host system 120), whereas inactive memory elements 302I are memory elements 302 that are not currently available to fulfill memory access requests through the performance of corresponding memory operations.

Although shown in FIG. 3 only in relation to the memory component 112A, each of the memory components 112A to 112N can include a set of active memory elements 302A and a set of inactive memory elements 302I. In one embodiment, the inactive memory elements 302I can be positioned in a predefined portion of a memory component 112. For example, as shown in FIG. 3, the inactive memory elements 302I can be located at the end of a memory component 112.

As noted above, the processing device detects a failure of a set of N active memory elements 302A at operation 202. For example, the processing device can detect the failure of three active memory elements 302A in the memory component 112A at operation 202 (i.e., N equals three). In one embodiment, the processing device detects a failure of an active memory element 302A by detecting the failure of one or more memory operations (e.g., read or write operations triggered by read or write requests received from a host system 120 and/or internally triggered memory operations, including read or write operations performed for wear leveling) in relation to the active memory element 302A. These failed memory operations can be complete failures (e.g., no data was written to or read from the memory element 302A) or partial failures that exceed a threshold value (e.g., data in an active memory element 302A contains a number of bit errors that exceeds a level of correction provided by associated ECC data). In one embodiment, the processing device tracks physical addresses of failed memory elements 302 in a data structure. For example, in response to detecting the N failed active memory elements 302A at operation 202, the processing device can add the physical addresses of these N failed active memory elements 302A to a queue for possible future reference.

At operation 204, the processing device determines that redundant memory in an external memory resource is needed to account for the N failed active memory elements 302A. For example, the processing device can determine that fewer than N inactive memory elements 302I are available locally and, based on this determination, the processing device determines that redundant memory in an external memory resource is needed to account for the N failed active memory elements 302A. In particular, although inactive memory elements 302I that are local to the processing device can be used as replacements for failed active memory elements 302A, as noted above, the memory components 112A to 112N have a limited amount of physical space and, consequently, only a limited number of inactive memory elements 302I can be present in each memory component 112A to 112N without significantly impacting the active capacity of the memory components 112A to 112N. After the number of failed active memory elements 302A has surpassed the number of originally available inactive memory elements 302I, the number of active memory elements 302A within a memory component 112 will begin to reduce and, consequently, the active memory capacity of the memory subsystem 110 will reduce. To account for this potential shortfall of active memory elements 302A within the memory components 112A to 112N, the processing device can utilize external memory resources in addition to local redundant memory resources. In the example of FIG. 3, six inactive memory elements 302I are available within the memory component 112A. Thus, the processing device (e.g., the memory subsystem 110) can locally handle the failure of up to six active memory elements 302A before needing to obtain support from external memory sources (e.g., the external storage system 121).

In response to the processing device determining that redundant memory in an external memory resource is needed to account for the N failed active memory elements 302A (potentially based on the processing device determining that N inactive memory elements 302I are unavailable within the memory components 112A to 112N), the method 200 moves to operation 206. At operation 206, the processing device transmits a redundant memory request (sometimes referred to as an external memory request) to the external storage system 121. The redundant memory request is used by the processing device to request the allocation and assignment of space in the external storage system 121 for use as a replacement for the N failed active memory elements 302A. In one embodiment, a single redundant memory request can be used to request the allocation and assignment of space in the external storage system 121 for multiple failed active memory elements 302A, while in another embodiment, each redundant memory request is associated with a single failed active memory element 302A. In this latter case, operation 206 along with subsequent operations 208 and 210 can be performed for each of the N failed active memory elements 302A described above. For purposes of illustration, the method 200 will be described in relation to the processing device using a single redundant memory request to request the allocation and assignment of space in the external storage system 121 for all N failed active memory elements 302A, where N is greater than or equal to one.

In some embodiments, the processing device can detect N active memory elements 302A failures. However, only N-x inactive memory elements 302I are available to partially replace the N failed active memory elements 302A (i.e., N-x inactive memory elements 302I in the memory components 112A to 112N are converted to active memory elements 302A to partially replace the N failed active memory elements 302A). In this scenario, the processing device uses the redundant memory request to request the allocation and assignment of space in the external storage system 121 for use as a replacement for the remaining x failed active memory elements 302A. For purposes of illustration, the redundant memory request is described hereinafter in relation to all of the N active memory elements 302A that the processing device detected to have failed. However, in some embodiments the N failed active memory elements 302A can be (1) partially replaced by local, inactive memory elements 302I and (2) partially replaced by space in the external storage system 121 via a redundant memory request, as described above.

The redundant memory request can include several pieces of data for facilitating the allocation and assignment of space in the external storage system 121. For example, the redundant memory request can include (1) credentials associated with the processing device (e.g., an identifier or a certificate of the memory subsystem 110 that will allow registration of the memory subsystem 110 with the external storage system 121 or registration/account information for the memory subsystem 110 corresponding to an account of the memory subsystem 110 in the external storage system 121), (2) an amount of space for allocation and assignment in the external storage system 121 (e.g., an amount of space equal to the N failed active memory elements 302A), and/or (3) data to use to perform a memory access operation (e.g., data from or originally intended to write to the failed memory element 302, which will now be written to a location in the external storage system 121).

In some embodiments, the processing device (e.g., the memory subsystem 110) does not include a network interface that will allow the processing device to be communicatively coupled to the external storage system 121 (e.g., a network adapter that complies with an Institute of Electrical and Electronics Engineers (IEEE) or 3rd Generation Partnership Project (3GPP) standard). However, the host system 120 does have a network interface that has established a connection to a network shared with the external storage system 121 or is otherwise capable of communicatively reaching the external storage system 121. In these embodiments, the processing device can transmit the redundant memory request to the external storage system 121 via the host system 120. For example, the processing device generates and transmits a redundant memory request to the host system 120. The host system 120 includes a corresponding memory driver to receive the redundant memory request, process the redundant memory request, and forward the redundant memory request to the external storage system 121. Accordingly, while the processing device does not include an interface for communicating with the external storage system 121, the host system 120 can provide such an interface for the processing device such that the host system 120 can transfer requests and confirmations/acknowledgements between the processing device and the external storage system 121. However, in some embodiments, the processing device includes a network interface for establishing a network connection and directly communicating with the external storage system 121. In these embodiments, transmitting the redundant memory request to the external storage system 121 via the host system 120 is unnecessary and the processing device can transmit the redundant memory request directly to the external storage system 121.

In some embodiments, the host system 120 can modify the redundant memory request prior to transmission to the external storage system 121. In addition, or in lieu of the pieces of data described above, the host system 120 can modify the redundant memory request to include credentials of the host system 120 (e.g., an identifier or a certificate of the host system 120).

At operation 208, the processing device receives a redundant memory request confirmation from the external storage system 121. In particular, in response to receipt of the redundant memory request, the external storage system 121 determines if the processing device is associated with an account in the external storage system 121. For example, when the redundant memory request includes registration/account information corresponding to an existing account of the processing device with the external storage system 121, the external storage system 121 (1) authenticates the redundant memory request based on the registration/account information, (2) assigns/allocates space for the N memory elements 302 indicated in the redundant memory request, and (3) writes data included in the redundant memory request, if any, to the assigned space in the external storage system 121. When the redundant memory request includes an identifier and/or certificate associated with the processing device or another indicator to generate an account in the external storage system 121, the external storage system 121 (1) creates an account for the processing device using the identifier and/or certificate, (2) assigns and allocates space for the N memory elements 302 indicated in the redundant memory request, and (3) writes data included in the redundant memory request, if any, to the assigned space in the external storage system 121. In some embodiments, upon the external storage system 121 creating an account associated with the processing device, the external storage system 121 also reserves a region of memory in the external storage system 121 for the memory subsystem 110 (e.g., a contiguous region of memory in the external storage system 121 equal to an integer multiple of the size of a memory element 302). In these embodiments, the external storage system 121 assigns and allocates space for the N memory elements 302 from this reserved region of memory in the external storage system 121 such that multiple redundant memory requests from the processing device can be serviced by a contiguous block of storage in the external storage system 121.

As noted above, along with assigning and allocating space for the N memory elements 302, the external storage system 121 can write data to the assigned space. For example, when the redundant memory request includes (1) data of a failed write attempt to a failed memory element 302 or (2) data that the processing device recovered or otherwise read from a failed memory element (i.e., the processing device preemptively determined that a memory element 302 was going to fail without relation to a triggering memory access operation), the external storage system 121 can write the data to the assigned space in the external storage system 121.

Based on the operations described above that are performed by the external storage system 121, the external storage system 121 generates a redundant memory request confirmation that is transmitted to the processing device and received by the processing device at operation 208. This redundant memory request confirmation can be routed through the host system 120 and indicates (1) a reference to a location(s)/address(es) in the external storage system 121 corresponding to the N memory element(s) 302, (2) confirmation of success of a write operation of data, if performed, and (3) when the external storage system 121 has generated a new account associated with the processing device, registration/account information necessary for the processing device to access the account in the future (e.g., a username, passcode, certificate, etc.).

At operation 210, the processing device updates memory management information based on the redundant memory request confirmation. In one embodiment, as shown in FIG. 3, the processing device can manage a logical-to-physical table 304, where each entry $306_1$-$306_{30}$ in the logical-to-physical table 304 (1) corresponds to a logical address used by a host system 120 and (2) references or otherwise identifies a physical address of an active memory element 302A or a redundant external memory location in the external memory system 121.

Figure 4:
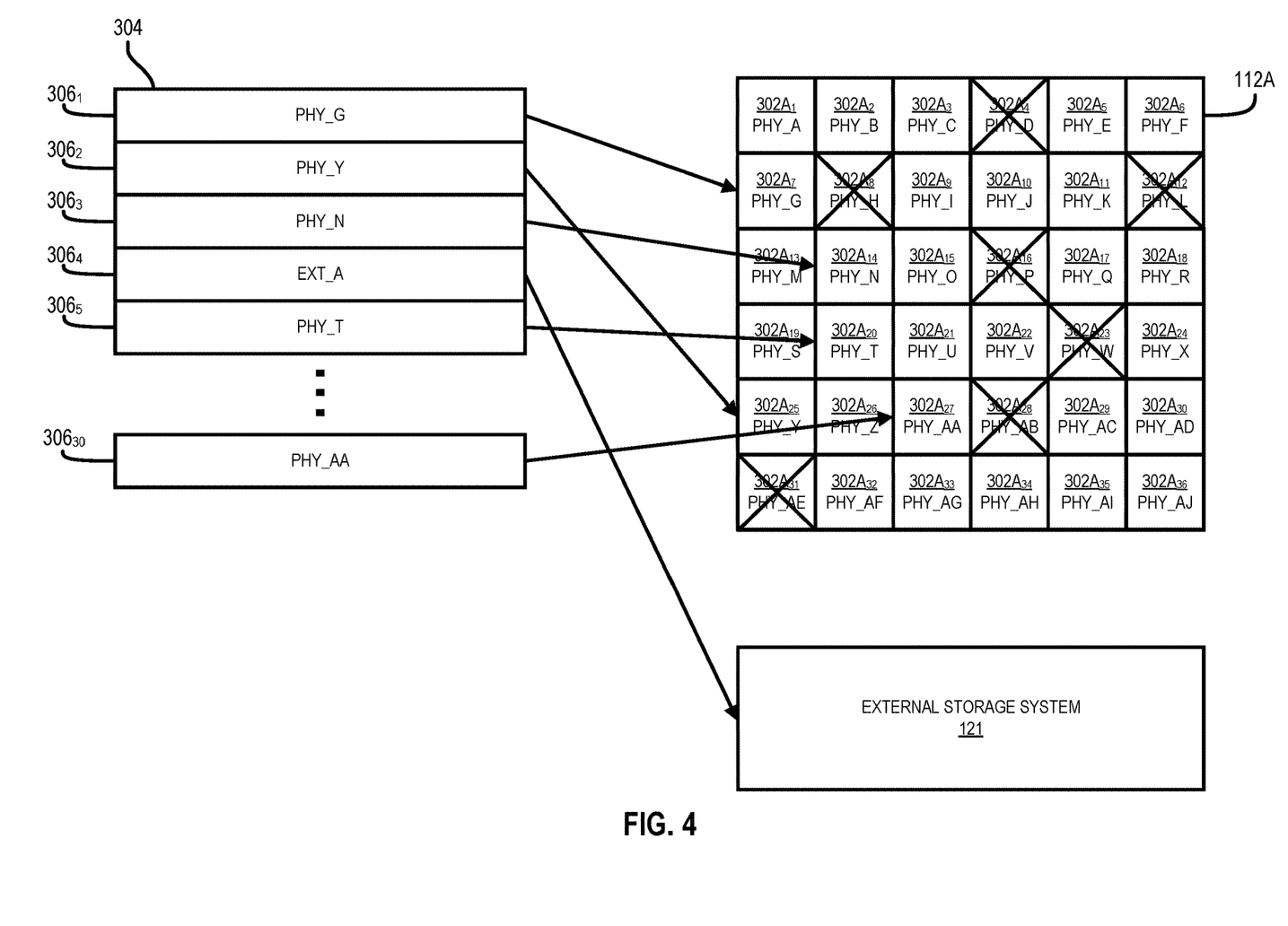
FIG. 4 shows the failure of seven memory elements and the mapping of an entry in the logical-to-physical table to a location in the external storage system to account for a memory element failure in excess of local redundant memory capacity, in accordance with some embodiments of the present disclosure.

When a location in the external storage system 121 replaces the failed active memory element $302A_4$, the processing device updates the logical-to-physical table 304 to reflect the mapping of an associated logical address with the location in the external memory system 121. For instance, FIG. 4 shows the logical-to-physical table 304 in which the entry $306_4$ has been modified to map the corresponding logical address (e.g., "0011") to a location/address in the external memory system 121 (e.g., the address EXT_A in the external memory system 121). As shown in FIG. 4, (1) there are no available inactive memory elements 302I, as seven memory elements 302 have failed (i.e., memory elements $302A_4$, $302A_8$, $302A_{12}$, $302A_{16}$, $302A_{23}$, $302A_{28}$, and $302A_{31}$), and (2) the entry $306_4$ references the external storage system 121 (i.e., "EXT") and a specific location/address in the external storage system 121 (i.e., the address "A").

Figure 5:
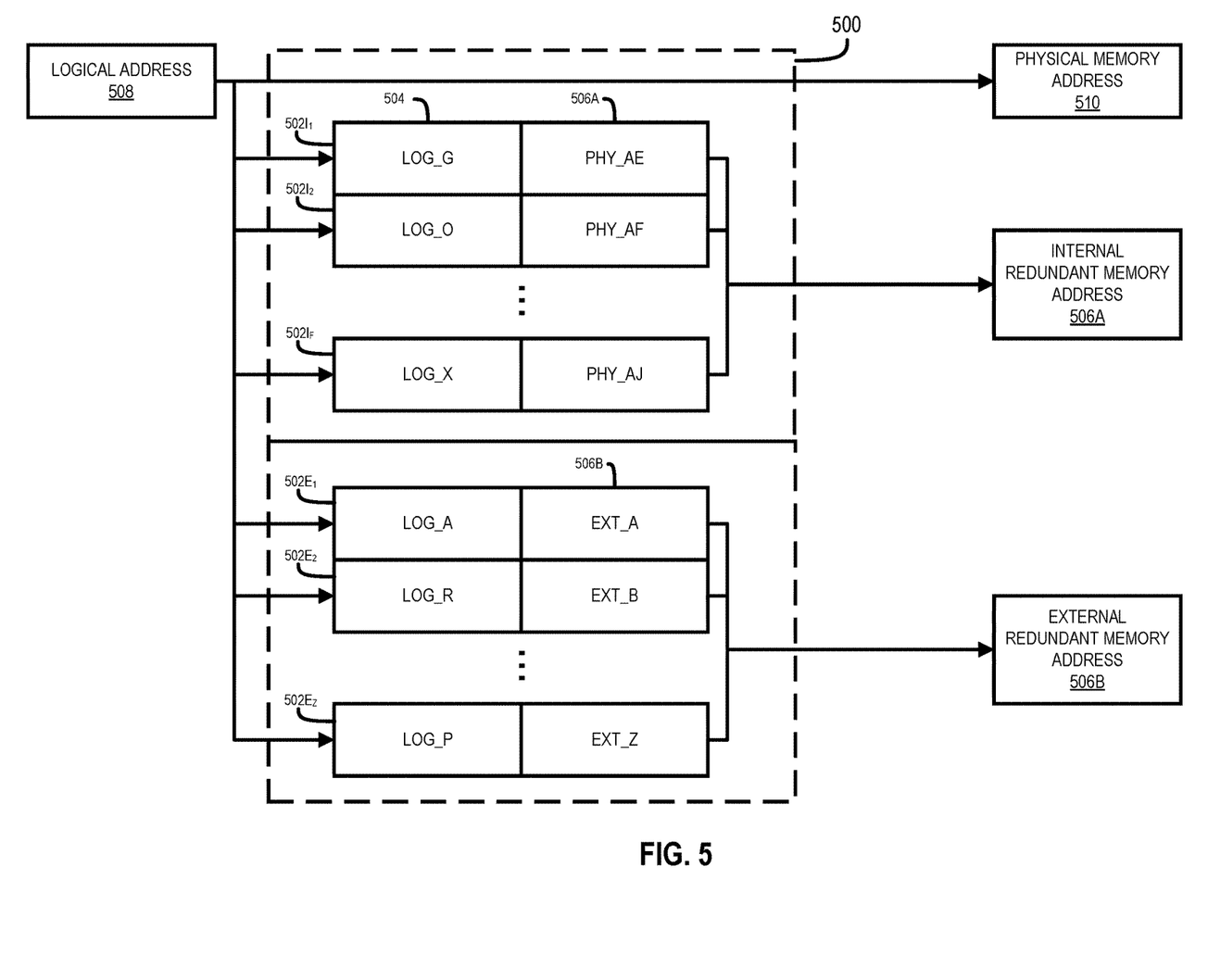
FIG. 5 shows an association map of logical addresses to local redundant memory elements and redundant memory in the external storage system, in accordance with some embodiments of the present disclosure.

Although described in relation to a logical-to-physical table 304, the processing device can track redundant memory usage in other data structures. For example, FIG. 5 shows an association map 500, according to one embodiment. As shown, the association map 500 includes a set of entries 502 that correspond to redundant memory resources. For example, the entries $502I_1$-$502I_F$ each correspond to redundant memory resources within the memory components 112A to 112N (e.g., the entries $502I_1$-$502I_F$ each correspond to the local inactive memory elements $302I_1$-$302I_6$, respectively) and the entries $502E_1$-$502E_Z$ each correspond to redundant memory resources outside the memory components 112A to 112N (e.g., the entries $502E_1$-$502E_Z$ each correspond to redundant memory resources in the external storage system 121). Each entry 502 in the association map 500 includes a redundant memory address 506 of a redundant memory resource and a logical address 504 associated with that redundant memory resource. For example, upon the processing device detecting a failed memory element 302, the processing device selects a redundant memory resource, with corresponding redundant memory address 506, for replacing this failed memory element 302 and adds an associated logical address 504 to the entry 502. Thus, the redundant memory address 506 corresponding to the redundant memory resource becomes associated with the logical address 504.

When the processing device processes a memory access operation, the processing device compares the logical address 508 of the memory access operation with the logical addresses 504 in each entry 502. When the processing device detects no match between the logical address 508 of the memory access operation and the logical addresses 504 of the entries 502, the processing device processes the memory access operation normally without using the association map 500. In some embodiments, this normal processing can include use of a logical-to-physical table to indicate a physical address 510 associated with the logical address 508. When the processing device detects a match between the logical address 508 of the memory access operation and a logical address 504 of an entry 502, the association map 500 is used to process the memory access operation. In particular, when the match is with one of the entries $502I_1$-$502I_F$, the internal redundant memory address 506A of the internal memory element 302 (e.g., a physical address on an internal memory element 302) is used to fulfill the memory access operation. In contrast, when the match is with one of the entries $502E_1$-$502E_Z$, the external redundant memory address 506B of the external memory resource is used to fulfill the memory access operation (e.g., the processing device triggers the transmission of a redundant memory request to the external storage system 121 via the host system 120 using the external redundant memory address 506B of the matching entry 502). As shown in FIG. 5, the entry $502I_1$ with the logical address 504 of LOG_G is associated with the internal redundant memory address 506A with the value PHY_AE, the entry $502I_2$ with the logical address 504 of LOG_O is associated with the internal redundant memory address 506A with the value PHY_AF, the entry $502I_F$ with the logical address 504 of LOG_X is associated with the internal redundant memory address 506A with the value PHY_AJ, the entry $502E_1$ with the logical address 504 of LOG_A is associated with the external redundant memory address 506B with the value EXT_A, the entry $502E_2$ with the logical address 504 of LOG_R is associated with the external redundant memory address 506B with the value EXT_B, and the entry $502E_Z$ with the logical address 504 of LOG_P is associated with the external redundant memory address 506B with the value EXT_Z.

As described above, the memory subsystem 110 can utilize redundant memory in an external storage system 121 to address memory element failures when local inactive memory elements 302I are unavailable. Accordingly, memory capacity can be extended with nearly limitless redundant resources. In some embodiments, use of redundant memory in an external storage system 121 is reserved for applications and/or data that are not latency intensive or are otherwise not critical (e.g., less frequently used data that is considered high-latency data based on the likely acceptance of a user for delay in accessing this data). For example, the memory subsystem 110 can store portions or pixels of an image corresponding to a high-definition view or rendering in the external storage system 121, while storing portions/pixels of an image corresponding to a lower-definition view/rendering in memory elements 302 of the memory subsystem 110 as users are more willing to accept delays/latency associated with retrieval of data in relation to high-definition content rather than lower-definition content. Accordingly, the memory subsystem 110 can classify the likely contents of a memory element 302 (e.g., based upon an identifier of an application or stream) and decide whether to use available redundant memory in the memory subsystem 110 (i.e., available inactive memory elements 302I in the memory subsystem 110) or eschew available redundant memory in the memory subsystem 110 in favor of available redundant memory in the external storage system 121.

Figure 6:
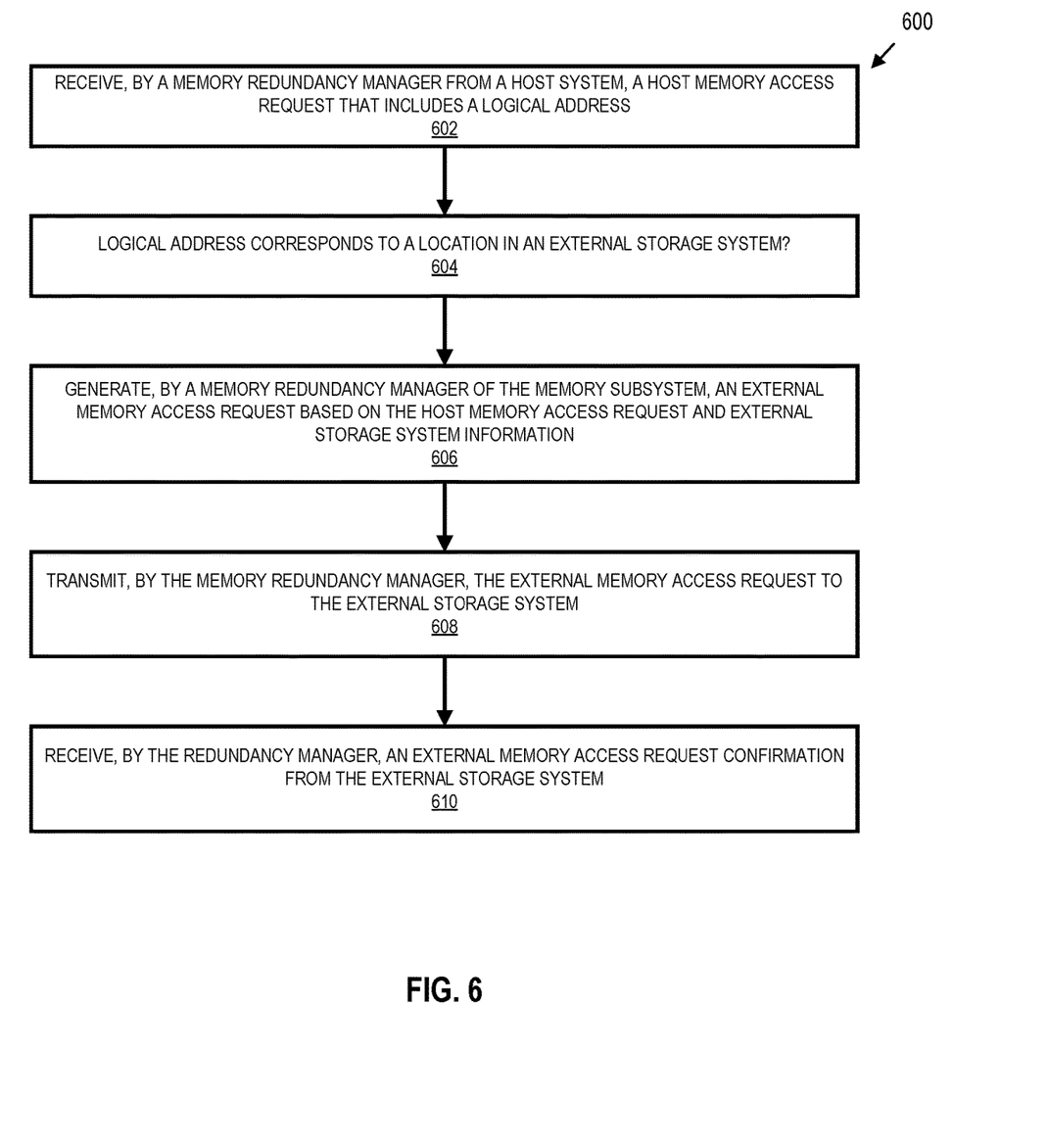
FIG. 6 is a flow diagram of an example method to manage memory element failures in accordance with some embodiments of the present disclosure.

FIG. 6 is a flow diagram of an example method 600 to manage memory element 302 failures, in accordance with some embodiments of the present disclosure. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by the memory redundancy manager 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 602, the processing device receives a memory access request from a host system 120 (sometimes referred to as a host memory access request). The host memory access request includes a logical address that is used by the host system 120 to access data. For example, the memory access request could be a read request that seeks to read data at a memory location corresponding to the logical address or a write/erase request that seeks to write/erase data at a memory location corresponding to the logical address.

At operation 604, the processing device determines that the logical address of the host memory access request corresponds to a location in the external storage system 121 instead of a local location (i.e., a location in the memory components 112A to 112N). For example, the processing device can index into the logical-to-physical table 304 to arrive at a corresponding entry 306 and determine that the logical address of the host memory access request corresponds to a location in the external storage system 121. For instance, the entry 306 can include a field or the address of the entry 306 can include a prefix to indicate that the logical address corresponds to a location in the external storage system 121 (e.g., "PHY" indicates that the logical address of the host memory access request corresponds to a location in the memory components 112A to 112N and "EXT" indicates that the logical address of the host memory access request corresponds to a location in the external storage system 121).

Although described in relation to the logical-to-physical table 304, in other embodiments, other techniques can be used by the processing device to determine that a logical address of a memory access request corresponds to a location in the external storage system 121. For example, as described above, the association map 500 can be used for tracking use of redundant memory, including external redundant memory resources in the external storage system 121.

At operation 606, in response to determining that the logical address of the memory access request corresponds to a location in the external storage system 121, the processing device generates an external memory access request based on (1) the host memory access request received from the host system 120 at operation 602 and/or (2) external storage system information. For example, the external storage system information can include registration/account information associated with the processing device that is used to authenticate the processing device with the external storage system 121 and access an associated account in the external storage system 121. This external storage system information can be paired in the external memory access request with an address in the external storage system 121 for referencing a location in the external storage system 121. In particular, when the host memory access request is a write operation, the external memory access request can include user data from the host memory access request needed to perform a write operation and an address relative to the external storage system 121 for use in writing the data to a location in the external storage system 121.

At operation 608, the processing device transmits the external memory access request to the host system 120. In an embodiment in which the processing device (e.g., the memory subsystem 110) does not have a network interface, the processing device can transmit the external memory access request to the host system 120 such that the host system 120 can transmit the external memory access request to the external storage system 121. In response, the external storage system 121 processes the external memory access request. For example, when the external memory access request corresponds to a write request originally received from the host system 120 at operation 602, the external storage system 121 writes the data included in the external memory access request to a location associated with an address included in the external memory access request. In contrast, when the external memory access request corresponds to a read request originally received from the host system 120 at operation 602, the external storage system 121 reads data from a location associated with an address included in the external memory access request.

At operation 610, the processing device receives an external memory access request confirmation from the external storage system 121. The external memory access request confirmation indicates (1) that the external memory access request was successfully processed and/or (2) provides relevant information associated with the external memory access request (e.g., data read from the external storage system 121 or an address where data was written in the external storage system 121). When the external memory access request confirmation includes an address in the external storage system 121 where user data was written, the processing device can update internal memory management information (e.g., the logical-to-physical table 304 or the association map 500) with the address. In particular, the processing device can update an entry 306 in the logical-to-physical table 304 corresponding to the logical address of the write request originally received from the host system 120 at operation 602 to reference the address in the external storage system 121. In some embodiments, the external memory access request confirmation can be routed to the processing device through the host system 120.

Figure 7:
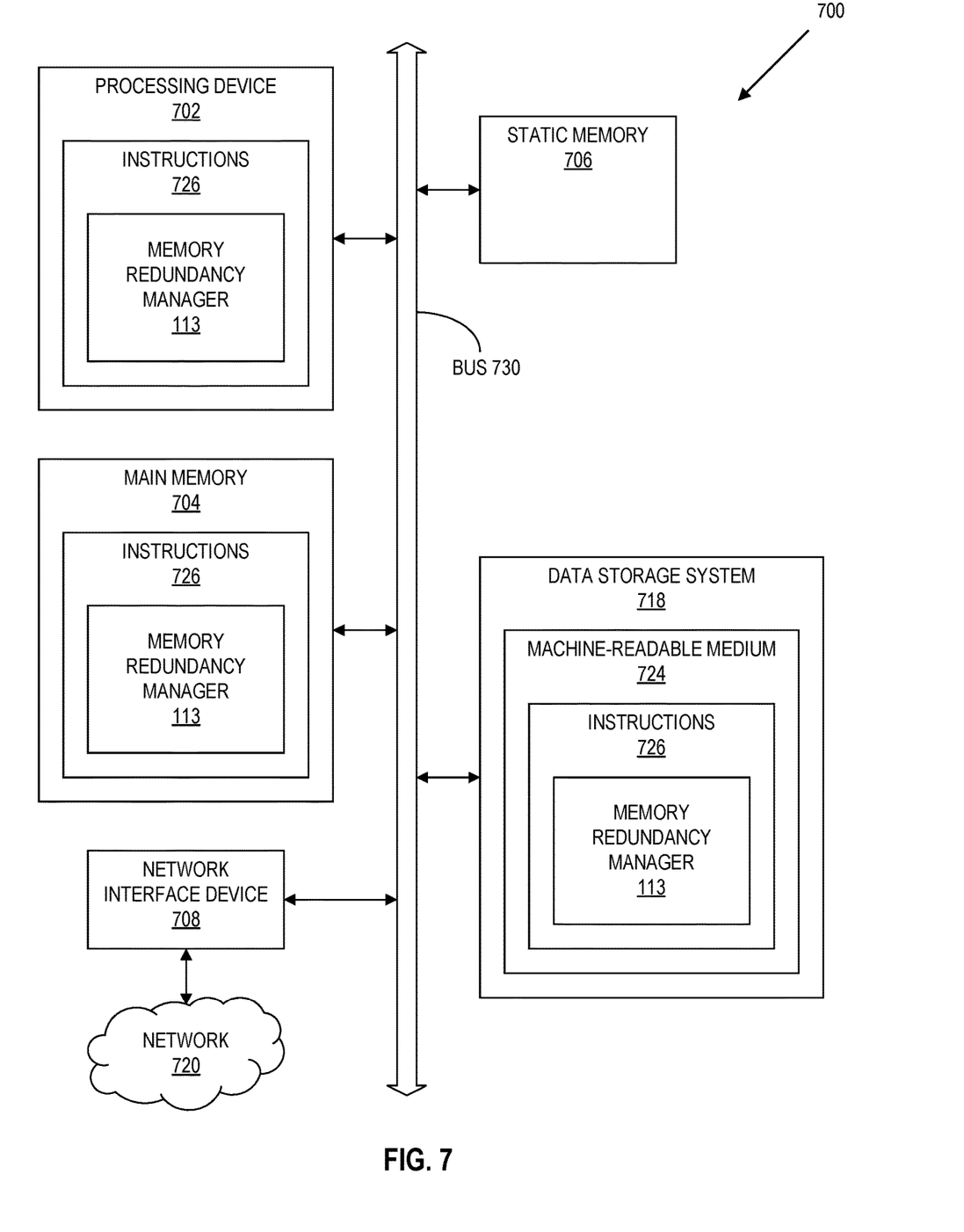
FIG. 7 is a block diagram of an example computer system in which embodiments of the present disclosure may operate.

FIG. 7 illustrates an example machine of a computer system 700 within which a set of instructions, for causing the machine to perform any one or more of the methodologies discussed herein, can be executed. In some embodiments, the computer system 700 can correspond to a host system (e.g., the host system 120 of FIG. 1) that includes, is coupled to, or utilizes a memory subsystem (e.g., the memory subsystem 110 of FIG. 1) or can be used to perform the operations of a controller (e.g., to execute an operating system to perform operations corresponding to the memory redundancy manager 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage system 718, which communicate with each other via a bus 730.

Processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein. The computer system 700 can further include a network interface device 708 to communicate over the network 720.

The data storage system 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory subsystem 110 of FIG. 1.

In one embodiment, the instructions 726 include instructions to implement functionality corresponding to a memory redundancy manager (e.g., the memory redundancy manager 113 of FIG. 1). While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the controller 115, may carry out the computer-implemented methods 200 and 600 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magneto-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method for managing memory element failures in a memory subsystem, the method comprising:
   detecting, by the memory subsystem, a failed memory element in the memory subsystem;
   transmitting, by the memory subsystem, a redundant memory request based on detection of the failed memory element, wherein the redundant memory request seeks to utilize memory storage in an external storage system in place of the failed memory element in the memory subsystem and wherein the redundant memory request is transmitted in response to determining that associated data of the failed memory element is high-latency data;
   receiving, by the memory subsystem from the external storage system, a redundant memory request confirmation, which indicates that the redundant memory request has been fulfilled and includes an address of a location in the external storage system; and
   updating, by the memory subsystem in response to receipt of the redundant memory request confirmation, memory management information to map a logical address, which was previously mapped to the failed memory element, to the location in the external storage system.

2. The method of claim 1, further comprising:
receiving, by the memory subsystem, a host memory access request that includes the logical address;
determining, by the memory subsystem, that the logical address corresponds to the location in the external storage system; and
transmitting, by the memory subsystem, an external memory access request to fulfill the host memory access request in response to determining that the logical address corresponds to the location in the external storage system.

3. The method of claim 2, wherein the memory subsystem determines that the logical address corresponds to the location in the external storage system based on the memory management information, and wherein the memory management information is a table that maps logical addresses to (1) physical addresses in the memory subsystem and (2) locations in the external storage system.

4. The method of claim 1, wherein the transmitting the redundant memory request is performed in response to determining that a local spare memory element is not available to replace the failed memory element.

5. The method of claim 1, wherein the memory subsystem transmits the redundant memory request to a host system communicatively coupled to the memory subsystem, and wherein the host system is to transmit the redundant memory request to the external storage system on behalf of the memory subsystem via a network interface of the host system.

6. The method of claim 1, wherein the failed memory element is a memory cell, a managed unit, or a logical block.

7. A system comprising:
a plurality of memory components; and
a processing device, operatively coupled with the plurality of memory components, to:
transmit a redundant memory request based on detection of a failed memory element in the plurality of memory components, wherein the redundant memory request seeks to utilize an external storage system in place of the failed memory element in the plurality of memory components and wherein the redundant memory request is transmitted in response to determining that associated data of the failed memory element is high-latency data,
receive, from the external storage system, a redundant memory request confirmation, which indicates that the redundant memory request has been fulfilled and includes an address of a location in the external storage system, and
update, in response to receipt of the redundant memory request confirmation, memory management information to include the address of the location in the external storage system.

8. The system of claim 7, wherein the processing device is further to:
receive a host memory access request that includes a logical address, which is mapped in the memory management information to the address of the location in the external storage system;
determine that the logical address corresponds to the location in the external storage system; and
transmit an external memory access request to fulfill the host memory access request in response to determining that the logical address corresponds to the location in the external storage system.

9. The system of claim 8, wherein the processing device determines that the logical address corresponds to the location in the external storage system based on the memory management information, and wherein the memory management information is a table that maps logical addresses to (1) physical addresses in the plurality of memory components and (2) locations in the external storage system.

10. The system of claim 7, wherein the transmitting the redundant memory request is performed in response to determining that a local spare memory element is not available to replace the failed memory element.

11. The system of claim 7, wherein the processing device transmits the redundant memory request to a host system communicatively coupled to the system, and wherein the host system is to transmit the redundant memory request to the external storage system on behalf of the system via a network interface of the host system.

12. The system of claim 7, wherein the memory element is a memory cell, a managed unit, or a logical block.

13. A non-transitory computer-readable storage medium comprising instructions that, when executed by a processing device, cause the processing device to:
detect a failed memory element in a memory subsystem;
transmit a redundant memory request based on detection of the failed memory element, wherein the redundant memory request seeks to utilize memory storage in an external storage system in place of the failed memory element in the memory subsystem and wherein the redundant memory request is transmitted in response to determining that associated data of the failed memory element is high-latency data;
receive, from the external storage system, a redundant memory request confirmation, which indicates that the redundant memory request has been fulfilled and includes an address of a location in the external storage system; and
update, in response to receipt of the redundant memory request confirmation, memory management information to map a logical address, which was previously mapped to the failed memory element, to the location in the external storage system.

14. The non-transitory computer-readable medium of claim 13, wherein the processing device is further to:
receive a host memory access request that includes the logical address;
determine that the logical address corresponds to the location in the external storage system; and
transmit an external memory access request to fulfill the host memory access request in response to determining that the logical address corresponds to the location in the external storage system.

15. The non-transitory computer-readable medium of claim 14, wherein the processing device determines that the logical address corresponds to the location in the external storage system based on the memory management information, and
wherein the memory management information is a table that maps logical addresses to (1) physical addresses in the memory subsystem and (2) locations in the external storage system.

16. The non-transitory computer-readable medium of claim 13, wherein the transmitting the redundant memory request is performed in response to determining that a local spare memory element is not available to replace the failed memory element.

17. The non-transitory computer-readable medium of claim 13, wherein the processing device is to transmit the redundant memory request to a host system communicatively coupled to the processing device, and wherein the host system is to transmit the redundant memory request to the external storage system on behalf of the processing device via a network interface of the host system.

18. The non-transitory computer-readable medium of claim 13, wherein the failed memory element is a memory cell, a managed unit, or a logical block.

\* \* \* \* \*